United States Patent
Tsai et al.

(10) Patent No.: US 9,606,885 B2
(45) Date of Patent: Mar. 28, 2017

(54) CHAINED BUS METHOD

(71) Applicant: Micron Technology, Inc., Boise, ID (US)

(72) Inventors: Victor Tsai, Palo Alto, CA (US); William Henry Radke, Los Gatos, CA (US); Bob Leibowitz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 152 days.

(21) Appl. No.: 14/053,255

(22) Filed: Oct. 14, 2013

(65) Prior Publication Data

US 2014/0040507 A1    Feb. 6, 2014

Related U.S. Application Data (62) Division of application No. 12/192,450, filed on Aug. 15, 2008, now Pat. No. 8,560,735.

(51) Int. Cl.
| | | |
|---|---|---|
| *G06F 3/00* | (2006.01) | |
| *G06F 12/00* | (2006.01) | |
| *G06F 11/30* | (2006.01) | |
| *G06F 13/42* | (2006.01) | |

(52) U.S. Cl.
CPC ...... *G06F 11/3034* (2013.01); *G06F 13/4234* (2013.01)

(58) Field of Classification Search
None
See application file for complete search history.

(56) References Cited

U.S. PATENT DOCUMENTS

| | | |
|---|---|---|
| 5,357,621 A | 10/1994 | Cox |
| 5,963,464 A | 10/1999 | Dell et al. |
| 7,286,384 B2 | 10/2007 | Wendt et al. |
| 7,421,525 B2 | 9/2008 | Polzin et al. |
| 7,889,595 B2 | 2/2011 | Park |
| 7,925,854 B2 * | 4/2011 | Oh ............... G06F 13/4239 710/9 |

(Continued)

FOREIGN PATENT DOCUMENTS

| | | |
|---|---|---|
| TW | 200525553 A | 7/2001 |
| WO | WO-2004102403 A2 | 11/2004 |

(Continued)

OTHER PUBLICATIONS

"International Application Serial No. PCT/US2009/053855, Search Report mailed Mar. 29, 2010", 7 pgs.

(Continued)

*Primary Examiner* — David E Martinez
(74) *Attorney, Agent, or Firm* — Schwegman Lundberg & Woessner, P.A.

(57) ABSTRACT

Memory devices and methods are described and shown that are capable of being configured in a chain. In one configuration, a single data input port and a single data output port are utilized at a host to communicate with the chain of memory devices. Methods for assigning identifiers to memory devices in the chain are described that include detection of a presence or absence of downstream memory devices. In selected examples, identifiers are assigned sequentially to memory devices in the chain until no additional downstream memory devices are detected.

20 Claims, 5 Drawing Sheets

(56) References Cited

U.S. PATENT DOCUMENTS

| | | |
|---|---|---|
| 8,560,735 B2 | 10/2013 | Tsai et al. |
| 2002/0038405 A1 | 3/2002 | Leddige et al. |
| 2004/0230718 A1 | 11/2004 | Polzin et al. |
| 2005/0138267 A1* | 6/2005 | Bains ............... G06F 13/1673 711/100 |
| 2006/0041394 A1* | 2/2006 | Kuwayama et al. ........... 702/57 |
| 2006/0179183 A1 | 8/2006 | Brittain et al. |
| 2007/0018299 A1 | 1/2007 | Koo et al. |
| 2007/0109833 A1* | 5/2007 | Pyeon ................... G11C 5/066 365/63 |
| 2008/0080492 A1* | 4/2008 | Pyeon ...................... G06F 1/04 370/389 |
| 2008/0155219 A1 | 6/2008 | Pyeon et al. |
| 2009/0055666 A1 | 2/2009 | Yee |
| 2010/0042750 A1 | 2/2010 | Tsai et al. |

FOREIGN PATENT DOCUMENTS

| | | |
|---|---|---|
| WO | WO-2010019860 A2 | 2/2010 |
| WO | WO-2010019860 A3 | 5/2010 |

OTHER PUBLICATIONS

"International Application Serial No. PCT/US2009/053855, Written Opinion mailed Mar. 29, 2010", 5 pgs.

"Taiwanese Application Serial No. 098127463, Office Action mailed May 27, 2014", 10 pgs.

\* cited by examiner

# CHAINED BUS METHOD

PRIORITY APPLICATION

This application is a divisional of U.S. application Ser. No. 12/192,450, filed Aug. 15, 2008, which is incorporated herein by reference in its entirety.

BACKGROUND

Peripheral devices such as memory devices are frequently coupled to a single host device, such as a computer. Examples of memory devices include flash memory, DRAM memory, one or more NAND devices or a Managed NAND implementation (NAND controller+NAND(s)), or other devices for data storage. One configuration for coupling multiple memory devices includes a radial arrangement. Radial configurations have a number of drawbacks such as increased pin counts required to attach all the memory devices. Other multi-drop or multi-bus configurations have been proposed, however problems exist with these configurations, such as bus contention among connected devices, and unacceptable signal integrity. An improved device arrangement and method of addressing the multiple memory devices is desired.

DETAILED DESCRIPTION

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Figure 1:
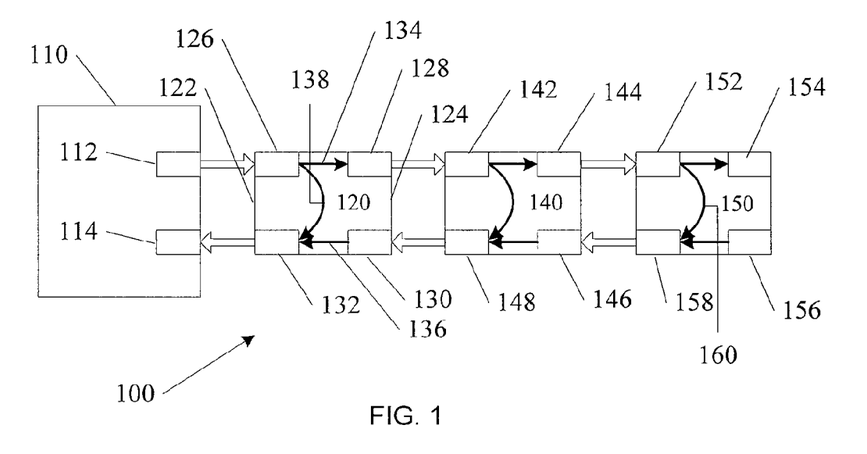
FIG. 1 shows a chained bus memory configuration according to an embodiment of the invention.

FIG. 1 shows an information handling system 100 including a chain of memory devices according to an example embodiment of the invention. Although memory devices are used as an example, other types of peripheral devices or combinations of devices are also within the scope of embodiments of the present invention. Examples of other devices include, but are not limited to, printers, scanners, cameras, wireless communication peripherals such as Bluetooth, or WiFi devices, external hard drives, flash drives, etc. Examples of memory devices include flash memory, DRAM memory, one or more NAND devices or a Managed NAND implementation (NAND controller+NAND(s)), or other devices for data storage.

Using memory devices as an example, in FIG. 1, a host 110 is shown having a data output port 112 and a data input port 114. Coupling memory devices to a single data output port 112 and a single data input port 114 reduces a number of pins needed on a host device 110, thus decreasing device cost, and simplifying production. In selected embodiments, single data ports such as the single data output port 112 or the single data input port 114 may each include multiple data lanes. The term single data port is used to illustrate a single serial connection to a host for multiple devices, in contrast to a parallel connection for each device on a host.

A first memory device 120 is shown with a second memory device 140 and a third memory device 150 coupled in a chain configuration. A chained memory device configuration as shown in FIG. 1 allows for point to point signaling. Using the configuration shown, a chain of memory devices can be arbitrarily long without the need for complex addressing circuitry as will be explained in more detail below.

In the example shown, all memory devices are substantially the same, however as discussed above, other configurations include various combinations of devices and/or memory devices. The first memory device 120 is shown with an upstream side 122 and a downstream side 124. An upstream data input port 126, a downstream data output port 128, a downstream data input port 130, and an upstream data output port 132 are shown. In operation, data or device commands such as address assignments, requests for data, etc. can pass through a given device such as from the upstream data input port 126 to the downstream data output port 128 along arrow 134. Alternatively, data/commands can pass internally within a given memory device such as along arrow 138 from the upstream data input port 126 to the upstream data output port 132. As shown, data/commands can also pass directly through a give device on a return path from the downstream data input port 130 to the upstream data output port 132 as shown by arrow 136.

As discussed above, the embodiment shown in FIG. 1 also illustrates a second memory device 140 having an upstream data input port 142, a downstream data output port 144, a downstream data input port 146, and an upstream data output port 148. Likewise, a third memory device 150 is shown having an upstream data input port 152, a downstream data output port 154, a downstream data input port 156, and an upstream data output port 158.

Although three memory devices are shown in the information handling system 100, the invention is not so limited. Using the configuration shown, any number of memory devices are possible, including only one memory device, or more than three memory devices.

In one example method of operation, each device in the chain boots with a default identifier. As an example, each memory device may boot with a default identifier of Device0. In one example, upon power up, each memory device then disables (e.g., turns off or "deactivates") its downstream data output port (128, 144, 154, etc.) In one example, if desired for power savings, each memory device further disables its upstream data output port (132, 148, 158, etc.).

The host 110 then turns on Device0, which by nature of the chain is the nearest memory device in the chain that has not been addressed. In the embodiment shown, only one Device0 at a time is enabled (e.g., turned on or "activated") because the host 110 only sees the next consecutive Device0 in the chain at a time. The host 110 then turns on the upstream data output port (132 for the first memory device 120) to allow communication back to the host 110. The host 110 then assigns an identifier by changing Device0 to an assigned identifier (such as DeviceA for a first memory device 120). DeviceA then responds to the host 110 and turns on its downstream data output port 128.

The host 110 then increments the identifier for the next memory device in the chain. The host 110 repeats the process by communicating to the next memory device in the chain along arrow 134, through the now active downstream data output port 128 to the second memory device 140. Prior to being assigned a new identifier, second memory device 140 still possesses its default identifier of Device0. After a process similar to that for first memory device 120, an incremented identifier is assigned, and downstream data output port 144 is enabled. The process is then repeated for the third memory device 150.

In one example, the process repeats until no response is received at the host from any additional downstream memory devices. In one embodiment, an absence of a response within a given time from an additional downstream memory device is taken as a detection of no additional downstream devices. In one embodiment, if no additional downstream device is detected, the last device in the chain disables its downstream data output port. Once no additional devices are detected, the addressing process is terminated, and data reading and writing operations are available.

In one example, the last device on the chain (for example device 150 from FIG. 1) is pre-configured to signal that it is the last device in the chain. For example, the last device can have an identifier of DeviceZ. In this example, the host looks for a response from a DeviceZ to indicate that an end of the chain has been reached.

Figure 2:
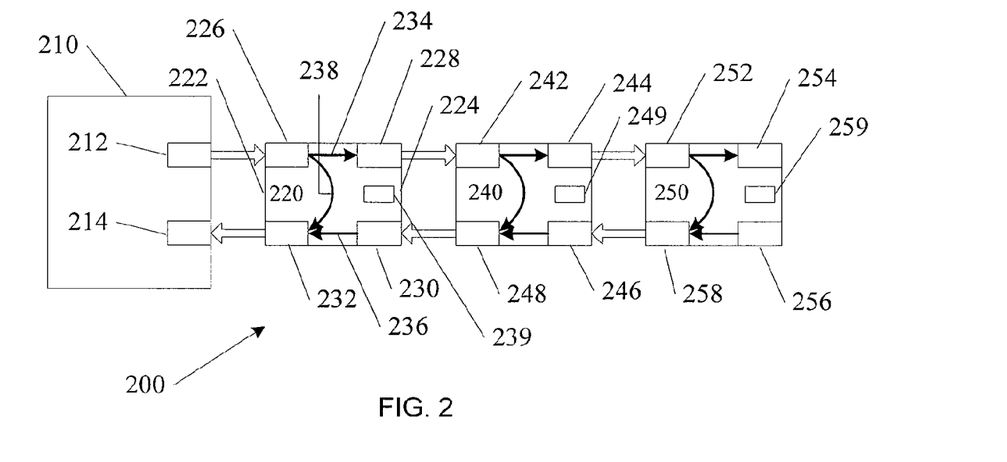
FIG. 2 shows another chained bus memory configuration according to an embodiment of the invention.

Another example configuration of an information handling system 200 including a chain of memory devices is shown in FIG. 2. A host 210 is shown, having a single data output port 212 and a single data input port 214. A first memory device 220 is shown with a second memory device 240 and a third memory device 250 coupled in a chain configuration. Although three memory devices in a chain are shown, the invention is not so limited.

Similar to the example shown in FIG. 1, all memory devices shown in FIG. 2 are substantially the same, however as discussed above, other configurations include various combinations of devices and/or memory devices. The first memory device 220 is shown with an upstream side 222 and a downstream side 224. An upstream data input port 226, a downstream data output port 228, a downstream data input port 230, and an upstream data output port 232 are shown. In operation, data or device commands such as address assignments, requests for data, etc. can pass through a given device such as from the upstream data input port 226 to the downstream data output port 228 along arrow 234. Alternatively, data/commands can pass internally within a given memory device such as along arrow 238 from the upstream data input port 226 to the upstream data output port 232. As shown, data/commands can also pass directly through a give device on a return path from the downstream data input port 230 to the upstream data output port 232 as shown by arrow 236.

As previously mentioned, the embodiment shown in FIG. 2 also illustrates a second memory device 240 having an upstream data input port 242, a downstream data output port 244, a downstream data input port 246, and an upstream data output port 248. Likewise, a third memory device 250 is shown having an upstream data input port 252, a downstream data output port 254, a downstream data input port 256, and an upstream data output port 258.

FIG. 2 also illustrates a first register 239 located on the first memory device 220. In one embodiment, the first memory device 220 is configured to store information concerning a presence or absence of a downstream memory device in the register 239. The term "register" is used generally to describe the local memory storage device in the first memory device 220. One of ordinary skill in the art, having the benefit of the present disclosure will recognize that any local information storage device capable of storing information concerning a presence or absence of a downstream memory device can be used.

In one embodiment, each memory device in the chain includes a register to store information concerning a presence or absence of a downstream memory device. FIG. 2 shows a second register 249 located on the second memory device 240, and a third register 259 located on the third memory device 250.

Similar to other embodiments, in one example method of operation, each device in the chain boots with a know identifier. As an example, each memory device may boot with a default identifier of Device0. In one example, upon power up of the system 200, all memory devices in the chain also power up at substantially the same time. Prior to having an identifier other than Device0 assigned, each memory device can initiate selected start up operations. Examples of start up operations for memory devices prior to address assignment include, but are not limited to: turning on transmit and receive functionality; starting clock training; and synchronization procedures.

In one embodiment, the memory devices in the chain are powered up in a high speed mode to further speed up the time that the devices will be ready to perform data operations. In one embodiment, the memory devices in the chain are powered up in a low speed mode to conserve power.

In one embodiment as shown in FIG. 2, all data input ports and data output ports are active to permit addressing and responses to the host 210 along all pathways shown in the Figure. Similar to other embodiments, the memory devices are assigned a unique identifier in sequential order, starting with the memory device in closest proximity to the host 210. As an example, an identifier such as a preset device identification or identifier such as Device0 is changed to a first identifier such as DeviceA.

In one embodiment, to facilitate detection of a presence or absence of a downstream device, a register as described above is included on each memory device. If a signal, such as a start up sequence, or other signal is detected on a downstream data input port (230, 246, 256, etc.) then a presence of a downstream memory device is detected. In one embodiment, the presence or absence of such a downstream memory device is stored in the register. Using registers or other storage devices on each memory device, each device quickly knows upon startup if there is an additional downstream device attached. In one embodiment a presence or absence of a downstream memory device is known by each memory device in the chain prior to an addressing operation.

In one embodiment, after identifier assignment, a response to the host 210 is sent, along with a state of the register, indicating the presence or absence of a downstream memory device. If a downstream memory device is indicated as present, then a next identifier is incremented (DeviceB, DeviceC, etc. for example) and the next memory device is assigned the next identifier in the sequence. If no downstream memory device is indicated, then the addressing process is terminated.

In one embodiment, a last memory device in the chain is pre-designated as a last memory device by pre-setting a state of the register. In other embodiments, as described above, the register is set based on whether or not a signals such as a start up sequence is detected on a downstream data input port.

In one embodiment, instead of responding to the host 210 after each identifier assignment, an identifier assignment is incremented and passed to the next memory device in the chain. Upon reaching the last device in the chain, a state of the last register is determined. As discussed above, an example includes a lack of detection of a signal in downstream data input ports (230, 246, 256, etc.). Another example includes detecting a pre-assigned state in the last memory device. Upon reaching the last memory device in the chain, a reply is then sent to the host 210. In this example, the host 210 determines how many memory devices are in the chain based on the increment of the last identifier returned to the host. The host 210 is then able to commence data operations with the known identifiers and known number of memory devices in the chain.

Figure 3:
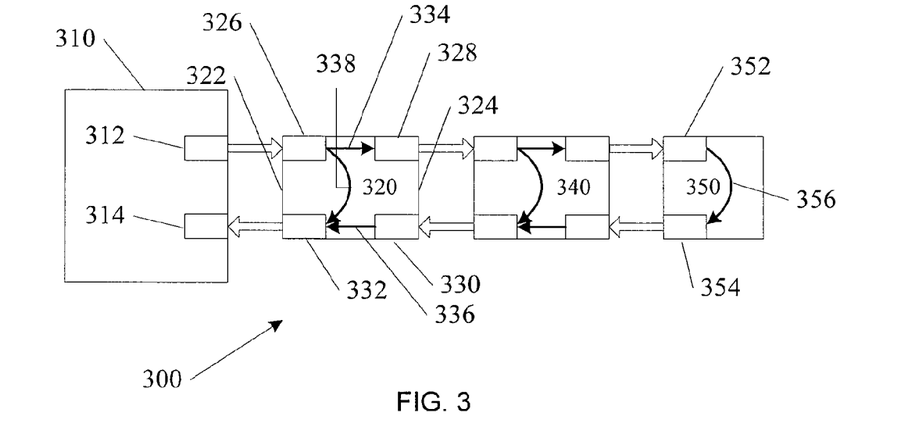
FIG. 3 shows another chained bus memory configuration according to an embodiment of the invention.

Another example configuration of an information handling system 300 including a chain of memory devices is shown in FIG. 3. A host 310 is shown, having a single data output port 312 and a single data input port 314. A first memory device 320 is shown with a second memory device 340 and a third memory device 350 coupled in a chain configuration. Although three memory devices in a chain are shown, embodiments with fewer than three memory devices and more than three memory devices are also possible.

The first memory device 320 is shown with an upstream side 322 and a downstream side 324. An upstream data input port 326, a downstream data output port 328, a downstream data input port 330, and an upstream data output port 332 are shown. Similar to previously discussed embodiments, data or device commands such as identifier assignments, requests for data, etc. can pass through a given device such as from the upstream data input port 326 to the downstream data output port 328 along arrow 334. Alternatively, data/commands can pass internally within a given memory device such as along arrow 338 from the upstream data input port 326 to the upstream data output port 332. As shown, data/commands can also pass directly through a give device on a return path from the downstream data input port 330 to the upstream data output port 332 as shown by arrow 336.

As previously mentioned, the embodiment shown in FIG. 3 also illustrates a second memory device 340 having an upstream data input port 342, a downstream data output port 344, a downstream data input port 346, and an upstream data output port 348.

In FIG. 3, a last memory device 350 is configured differently than other memory devices in the chain. The last memory device 350 shown in FIG. 3 includes an upstream data input port 352 and an upstream data output port 354, however the last memory device 350 does not include any unnecessary downstream ports. Using the configuration of FIG. 3, a cost savings is realized by not including unnecessary ports. In configurations where all memory devices have both upstream and downstream ports, manufacturing and assembly is simplified because all memory devices are the same.

A simplified last memory device as shown in FIG. 3 can be implemented in configurations and methods similar to those described above and shown in FIGS. 1 and 2. For example, in one embodiment the first memory device 320 and the second memory device 340 include circuitry to enable a downstream data output port upon receipt of instruction from the host 310. In one embodiment, the first memory device 320 and the second memory device 340 include a register (not shown) to indicate a presence or absence of downstream memory devices.

Embodiments shown in FIGS. 1-3 may include hard wired memory devices, or they may include sockets for assembly or expanding memory capabilities. Example embodiments may include a number of expansion sockets, where the last memory device 350 is the last in the chain, yet there are still available sockets downstream. In one such a configuration, the last memory device can be removed and additional memory devices placed in the chain, then the last memory device is reinserted at the end of the newly lengthened chain. In embodiments where all memory devices are substantially the same, additional memory devices can be added to the end of the chain for expansion purposes without having to remove and reinstall a dedicated last memory device.

Figure 4:
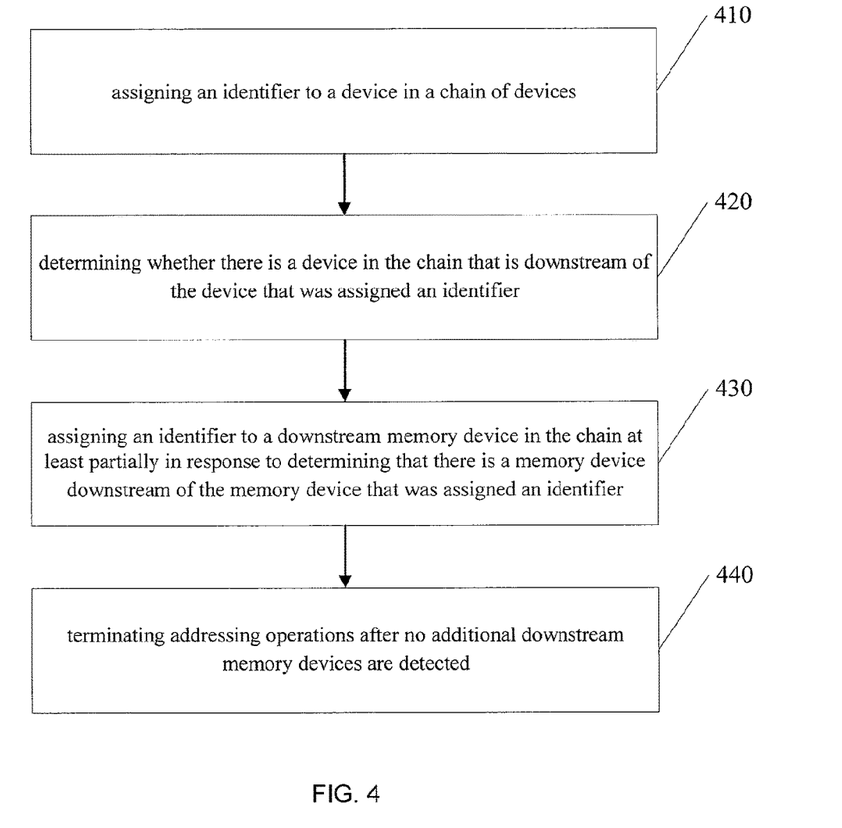
FIG. 4 shows a method of assigning identifiers to memory devices according to an embodiment of the invention.
Figure 5:
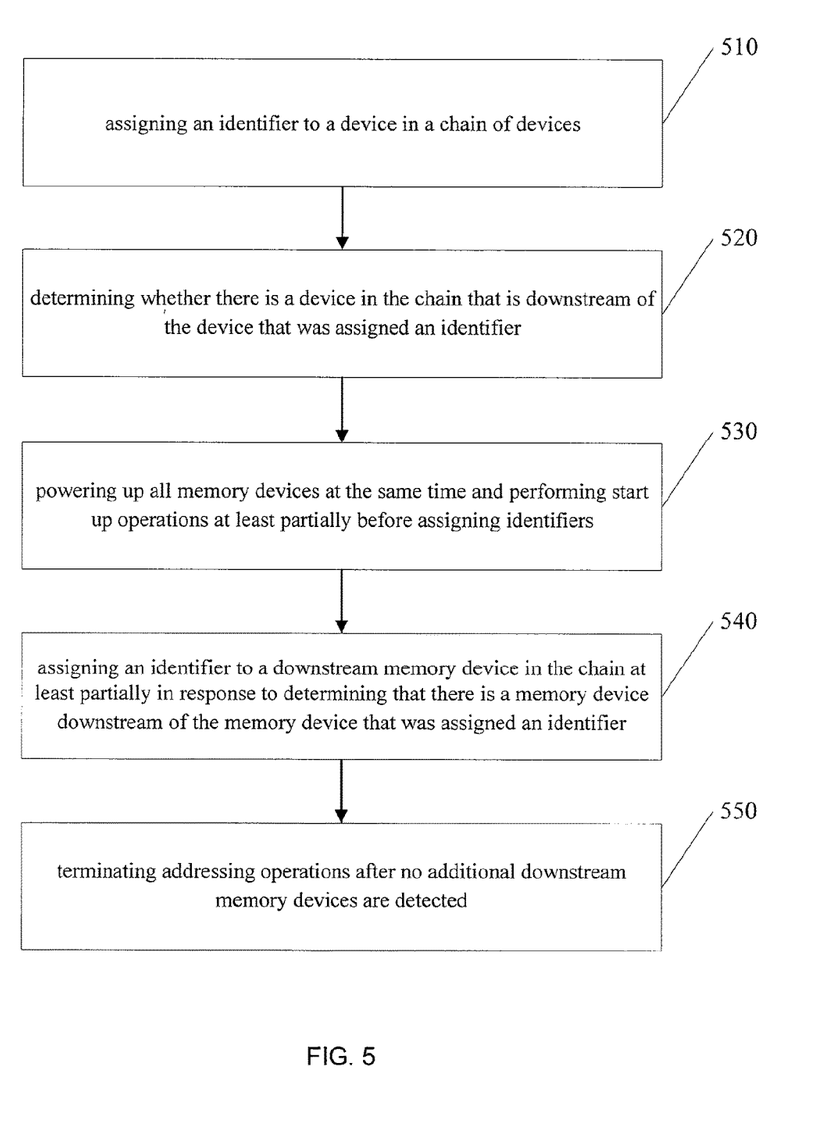
FIG. 5 shows another method of assigning identifiers to memory devices according to an embodiment of the invention.

FIGS. 4 and 5 describe selected examples of operation of information handling systems using memory chains as described in embodiments above. FIG. 4 illustrates a method where an identifier is assigned to a device in a chain of devices as shown in operation 410. In one embodiment, the first memory device nearest to the host device is assigned the first identifier. The next nearest memory device to the host device in the chain is assigned a second identifier, etc. until an end of the chain is reached. In a chained arrangement, as illustrated in example embodiments in FIGS. 1-3, an addressing operation is made easier by having a sequential order of devices and after each identifier assignment, incrementing a next identifier. Such an arrangement allows operation without having a dedicated identifier to a particular memory socket. Additionally, the number of memory devices can be easily varied. For example, additional memory devices can be added to expand the total memory, and addressing the additional memory devices is only a matter of assigning an identifier to a next device in a chain.

Operation 420 recites determining whether there is a device in the chain that is downstream of the device that was assigned an identifier. In one embodiment, identifiers are assigned as outlined in operation 430. In one example, identifiers are assigned sequentially, and incremented after each assignment. In one embodiment, a presence of a downstream device is assumed unless an absence is detected. In one example, an absence of a downstream device is detected by looking for a response from a next memory device in the chain. If after a given time, no device has responded to the host, it is assumed that no additional downstream devices are present, and that the last device to be assigned an identifier and to have responded to the host is the last memory device in the chain.

In another example, a last device in the chain includes a dedicated identifier that is pre-assigned as a last device in a chain. In general, as illustrated in operation 440, the addressing operation is terminated by the host device once it is determined that no additional downstream memory devices are present. An example of detection of a last device in the chain includes notification from a dedicated last device as illustrated in FIG. 3.

When a host device gets through the chain and reaches the last device, the last device with the dedicated identifier then responds to the host device that all memory devices present have been addressed and the addressing operation is terminated. Another example of detection of a last device in the chain includes a "time out" operation where no additional memory devices respond as discussed above. Another example of detection of a last device in the chain includes a response from a last device in the chain where the device status is pre-assigned. Other examples of detection of a presence or absence of a last memory device in the chain will be discussed in further examples below.

FIG. 5 illustrates a method where identifiers are assigned to devices in a chain of devices as shown in operation 510. In one embodiment, the devices include memory devices, as illustrated in previous figures. A determination is made in operation 520 whether or not there is a downstream device present. In one embodiment, a presence or absence of a downstream device detected at a host by a device state that is reported from a register located on each memory device. In one example, the register state is determined by looking for a response from a next memory device in the chain, with the presence or absence being recorded in a register, or other storage device. If after a given time, no device has responded to the host, the system assumes that no additional downstream devices are present, and that the last device to be assigned an identifier and to have responded to the host is the last memory device in the chain.

Operation 530 recites powering up all memory devices at the same time and performing start up operations at least partially before assigning identifiers. As discussed above, examples of start up operations include, but are not limited to turning on transmit and receive functionality, starting clock training, and synchronization procedures. In one example, the memory devices are powered up in a high speed mode to make them available for data operations more quickly. In another example, the memory devices are powered up in a lower speed mode to conserve power.

An identifier is assigned to each memory device in the chain in operation 540. In one embodiment, the first memory device nearest to the host device is assigned the first identifier. As in embodiments described above, the next nearest memory device to the host device in the chain is assigned a second identifier, etc. until an end of the chain is reached.

As discussed above, selected embodiments use pre-configured information stored in the last device in the chain. Last device information can be stored as a pre-determined last device identifier, or as a pre-assigned register state, etc. As illustrated in operation 550, the addressing operation is terminated by the host device once it is determined that no additional downstream memory devices are present.

Figure 6:
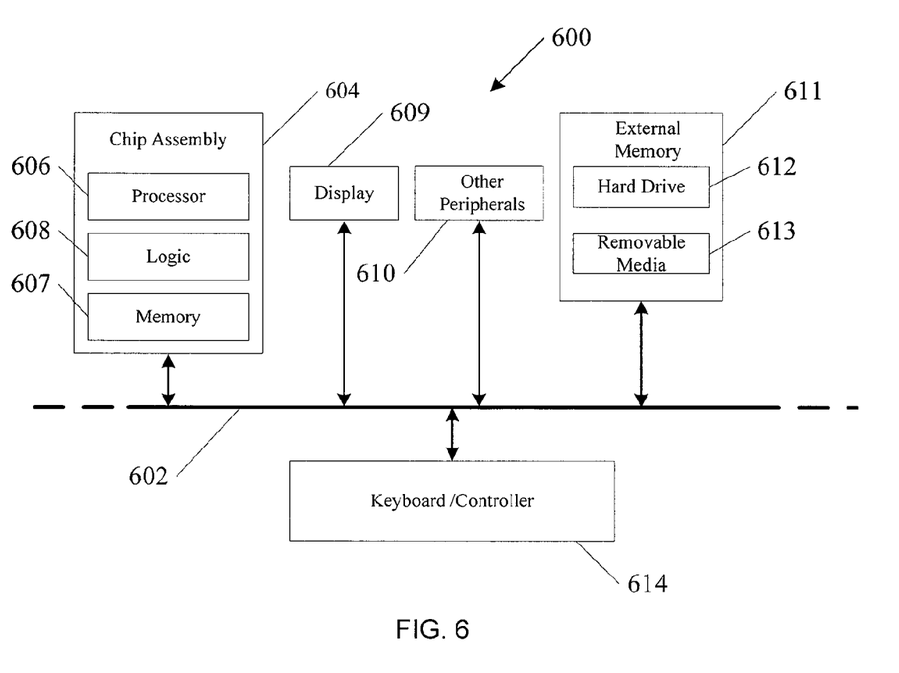
FIG. 6 shows an information handling system including a memory device according to an embodiment of the invention.

An embodiment of an information handling system such as a computer is included in FIG. 6 to show an example of a high-level device application, such as a personal computer, for the present invention. FIG. 6 is a block diagram of an information handling system 600 incorporating at least one chip or chip assembly 604 that includes a memory device according to an embodiment of the invention. Information handling system 600 is merely one embodiment of an electronic system in which the present invention can be used. Other examples include, but are not limited to, personal data assistants (PDAs), cellular telephones, MP3 players, aircraft, satellites, military vehicles, etc.

In this example, information handling system 600 comprises a data processing system that includes a system bus 602 to couple the various components of the system. System bus 602 provides communications links among the various components of the information handling system 600 and may be implemented as a single bus, as a combination of busses, or in any other suitable manner.

Chip assembly 604 is coupled to the system bus 602. Chip assembly 604 may include any circuit or operably compatible combination of circuits. In one embodiment, chip assembly 604 includes a processor 606 that can be of any type. As used herein, "processor" means any type of computational circuit such as, but not limited to, a microprocessor, a microcontroller, a graphics processor, a digital signal processor (DSP), or any other type of processor or processing circuit.

In one embodiment, a memory chip 607 is included in the chip assembly 604. Those skilled in the art will recognize that a wide variety of memory device configurations may be used in the chip assembly 604. Acceptable types of memory chips include, but are not limited to, Dynamic Random Access Memory (DRAMs) such as SDRAMs, SLDRAMs, RDRAMs and other DRAMs. Memory chip 607 can also include non-volatile memory such as flash memory. In one embodiment, the memory chip 607 includes a phase change random access memory (PCRAM).

In one embodiment, additional logic chips 608 other than processor chips are included in the chip assembly 604. An example of a logic chip 608 other than a processor includes an analog to digital converter. Other circuits on logic chips 608 such as custom circuits, an application-specific integrated circuit (ASIC), etc. are also included in one embodiment of the invention.

Information handling system 600 may also include an external memory 611, which in turn can include one or more memory elements suitable to the particular application, such as one or more hard drives 612, and/or one or more drives that handle removable media 613 such as floppy diskettes, compact disks (CDs), digital video disks (DVDs), and the like. A memory constructed as described in examples above is included in the information handling system 600.

Information handling system 600 may also include a display device 609 such as a monitor, additional peripheral components 610, such as speakers, etc. and a keyboard and/or controller 614, which can include a mouse, trackball, game controller, voice-recognition device, or any other device that permits a system user to input information into and receive information from the information handling system 600.

While a number of embodiments of the invention are described, the above lists are not intended to be exhaustive. Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative and not restrictive. Combinations of the above embodiments, and other embodiments, will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

What is claimed is:

1. A method, comprising:
   assigning a first identifier to an upstream device in a chain of devices;
   determining whether there is a downstream device in the chain that is downstream of the device that was assigned the first identifier;
   enabling an upstream data output port on the upstream device after assigning the first identifier;
   enabling a downstream data output port on the upstream device after assigning the first identifier; and assigning a second identifier to the downstream device in the chain at least partially in response to determining that the downstream device is present.

2. The method of claim 1, wherein assigning the first identifier to the upstream device in the chain includes assigning a first identifier to a memory device in the chain.

3. The method of claim 2, further including powering up sequential memory devices one at a time and assigning identifiers as each memory device is powered up.

4. The method of claim 2, wherein determining comprises enabling the downstream data output port on the upstream device and determining whether a signal is received on a downstream data input port from the downstream device.

5. The method of claim 2, further including powering up all devices in the chain and performing start up operations at least partially before assigning identifiers sequentially.

6. The method of claim 5, wherein performing start up operations includes performing clock training and synchronization.

7. The method of claim 6, wherein determining whether there is a downstream device includes detecting whether a signal is received on a downstream data input port from the downstream device.

8. The method of claim 7, further including storing an indication of a presence or absence of the downstream device in a storage device in the upstream device.

9. The method of claim 2, further comprising booting each device in the chain with a known identifier.

10. The method of claim 9, wherein the known identifier is one of a default identifier and an identifier of a last memory device in a chain at a downstream end.

11. The method of claim 10, wherein assigning the first identifier and the second identifier comprises changing the default identifier to the first identifier and the second identifier in a sequential manner.

12. The method of claim 2, further comprising storing an indication of a presence or absence of a downstream device in a respective storage device associated with each of the devices.

13. The method of claim 2, wherein determining whether there is a downstream device comprises determining whether the downstream device is configured in such a way as to indicate that it is a last device in the chain of devices.

14. The method of claim 13, wherein determining whether the memory device is configured in such a way as to indicate that it is a last device in the chain of devices comprises determining whether the downstream device does not have a downstream port.

15. The method of claim 2, further comprising disabling a downstream port of the upstream device if it is determined that there is no device in the chain that is downstream of the upstream device.

16. The method of claim 2, further comprising enabling an upstream output of the downstream device before assigning the second identifier.

17. The method of claim 2, further comprising enabling a downstream output of the downstream device after assigning the second identifier.

18. A method, comprising:
incrementally powering up each memory device a memory device chain, including;
    enabling an upstream input port and an upstream output port on an upstream memory device;
    assigning a unique identifier to the upstream memory device;
    enabling an upstream data output port on the upstream device after assigning the unique identifier;
    detecting when no additional downstream devices are present by enabling a downstream data output port on the upstream memory device and determining whether a signal is received on a downstream data input port on the upstream memory device from a downstream memory device; and
    disabling the downstream output port on the upstream memory device if no downstream memory device is detected.

19. The method of claim 18, wherein only a last memory device in the memory device chain communicates back to a host device, and the host device determines how many total memory devices are present.

20. The method of claim 18, wherein the downstream output port on the upstream memory device is enabled after the unique identifier is assigned to the upstream memory device.

* * * * *